US009408103B2

(12) United States Patent
Bai et al.

(10) Patent No.: US 9,408,103 B2
(45) Date of Patent: Aug. 2, 2016

(54) FLEXIBLE MEASUREMENTS IN UNLICENSED BAND

(75) Inventors: Wei Bai, Beijing (CN); Tero Henttonen, Espoo (FI); Na Wei, Beijing (CN); Jing Han, Beijing (CN); Haiming Wang, Beijing (CN)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/354,248

(22) PCT Filed: Oct. 26, 2011

(86) PCT No.: PCT/CN2011/081319
§ 371 (c)(1),
(2), (4) Date: Apr. 25, 2014

(87) PCT Pub. No.: WO2013/059999
PCT Pub. Date: May 2, 2013

(65) Prior Publication Data
US 2014/0302865 A1    Oct. 9, 2014

(51) Int. Cl.
H04W 24/10    (2009.01)
H04W 72/04    (2009.01)
H04W 16/14    (2009.01)

(52) U.S. Cl.
CPC ............ *H04W 24/10* (2013.01); *H04W 72/042* (2013.01); *H04W 72/0413* (2013.01); *H04W 16/14* (2013.01)

(58) Field of Classification Search
CPC . H04W 24/10; H04W 24/02; H04W 72/0413; H04W 72/042; H04W 16/14
See application file for complete search history.

(56) References Cited

U.S. PATENT DOCUMENTS

2008/0025254 A1    1/2008  Love et al.
2008/0189970 A1*   8/2008  Wang et al. ............... 33/701

(Continued)

FOREIGN PATENT DOCUMENTS

WO    2013006988    1/2013

OTHER PUBLICATIONS

3GPP TS 36.300 version 10.4.0 release 10; Evolved Universal Terrestrial Radio Access (E-UTRA) and Evolved Universal Terrestrial Radio Access Network (E-UTRAN) Overall description; stage 2 (208 pages), Jun. 2011.

(Continued)

*Primary Examiner* — Kashif Siddiqui
*Assistant Examiner* — Minjung Kim
(74) *Attorney, Agent, or Firm* — Oblon, McClelland, Maier & Neustadt, L.L.P

(57) ABSTRACT

The specification and drawings present a new method, apparatus and software related product (e.g., a computer readable memory) for implementing enhanced and flexible radio aperiodic measurements, e.g., on an unlicensed band in LTE wireless systems and providing effective and timely reporting. A UE may receive from a wireless network an aperiodic measurement request to measure a special measurement object (e.g., a neighbor cell) specified in the aperiodic measurement request, e.g., in an unlicensed band. In response to the aperiodic measurement request, the UE may perform the measurement of the special management object until a further instruction from the wireless network or for a determined period of time. Inter-frequency measurements may be performed during the measurement gap determined from the aperiodic measurement request.

16 Claims, 4 Drawing Sheets

(56) References Cited

U.S. PATENT DOCUMENTS

| | | |
|---|---|---|
| 2008/0299955 A1 | 12/2008 | Lee et al. |
| 2010/0027438 A1* | 2/2010 | Cai .............................. 370/252 |
| 2010/0190488 A1 | 7/2010 | Jung et al. |
| 2011/0175773 A1* | 7/2011 | Syrjarinne et al. ....... 342/357.25 |
| 2011/0287794 A1* | 11/2011 | Koskela et al. ............... 455/509 |

OTHER PUBLICATIONS

3GPP TS 36.311 version 10.2.0 release 10; Evolved Universal Terrestrial Radio Access (E-UTRA); Radio Resource Control (RRC); Protocol specification (298 pages), Jul. 2011.

\* cited by examiner

FLEXIBLE MEASUREMENTS IN UNLICENSED BAND

TECHNICAL FIELD

The exemplary and non-limiting embodiments of this invention relate generally to wireless communications and more specifically to implementing flexible (e.g., aperiodic) measurements of a special measurement object in an unlicensed band in LTE wireless systems.

BACKGROUND ART

The following abbreviations that may be found in the specification and/or the drawing figures are defined as follows:

3GPP Third Generation Partnership Project
ANR Automatic Neighbor Relation
BW Bandwidth
CA Carrier Aggregation
CC Component Carrier
CDM Code Division Multiplexing
CRS Cell Specific Reference Signal
DCI Downlink Control Information
DL Downlink
DRX Discontinuous Reception
eICIC Enhanced Inter-Cell Interference Coordination
E-UTRA Evolved Universal Terrestrial Radio Access
eNB Evolved Node B/Base Station in an E-UTRAN System
E-UTRAN Evolved UTRAN (LTE)
FDD Frequency Division Duplex
FDM Frequency Division Multiplexing
IE Information Element
ISM Industrial, Scientific, Medical
L3 Layer 3 (network layer)
LTE Long Term Evolution
LTE-A Long Term Evolution Advanced
MAC Medium Access Control
MAC CE MAC Control Element
MGRP Measurement Gap Repetition Period
PDCCH Physical Downlink Control Channel
PDSCH Physical Downlink Shared Channel
PCell Primary Cell
PHY Physical Layer
PUCCH Physical Uplink Control Channel
PUSCH Physical Uplink Shared Channel
RAT Radio Access Technology
RNTI Radio Network Temporary Identity
RRC Radio Resource Control
RRM Radio Resource Management
Rx Reception, Receiver
SCell Secondary Sell
SFN System Frame Number
SI System Information
TA Timing Advance
TD Timing Delay
TDD Time Division Duplex
TDM Time Division Multiplexing
TTI Transmission Time Interval
TTT Time To Trigger
Tx Transmission, Transmitter
UE User Equipment
UL Uplink
UTRAN Universal Terrestrial Radio Access Network LTE-A (Long Term Evolution Advanced) aims at providing significantly enhanced services by means of higher data rate and lower latency with a reduced cost. Carrier Aggregation (CA) is one of key technologies to greatly improve the data rate. In Release 10 of 3GPP, the current discussion is mainly about CA of either FDD-FDD system or TDD-TDD system on licensed LTE bands, which are scarce resources.

Unlicensed band utilization for LTE systems is a subject of recent research as it may offer an operator an opportunity to offload traffic from a crowded licensed LTE band to an unlicensed band if necessary. This is likely to be considered in Release 12 of 3GPP and beyond releases of 3GPP documents. By using the unlicensed band and licensed band CA, we can get some valuable benefits such as balancing the traffic load when necessary, improving the peak data rate, and improving the spectrum efficiency in general for the operator.

The available unlicensed bands are different in different geographical locations around the world. The most commonly considered unlicensed spectrum is 2.4 GHz ISM band with BW of 83.5 MHz, the 5 GHz unlicensed band with BW larger than 100 MHz, and White Space spectrum which comprises unused parts (bands) of TV spectrum in the 54-698 MHz range (now only US). However, quite a few challenges for the unlicensed band need to be resolved before efficient utilization can be made. One critical issue is the unlicensed band's inherent "share" property. For example for ISM bands, there may be WIFI systems (IEEE 802.11 a/b/g/n/ac), as well as BLUETOOTH, ZIGBEE, WIRELESSUSB, CORDLESS PHONE, MICROWAVE, etc. As for White Space spectrum bands, there may be some other systems also trying to use those spectrum bands. In order to deploy the LTE system on the unlicensed band, an eNB will need to turn off its use of unlicensed bands from time to time due to a large interference or due to giving another system a chance to transmit. An irregular ON/OFF mechanism of LTE system is described in PCT Application PCT/CN2011/001167 filed Jul. 14, 2011.

Before configuring a SCell to a UE, it is important that the eNB knows whether or not the concerned UE is in the coverage of the corresponding carrier. Currently, in the LTE system, the UE will do RRM measurement on any configured measurement object, but the choice of which object to measure is up to a UE implementation. Since the LTE system may have an irregular ON/OFF mechanism on the unlicensed band, leaving the measurement object choice purely to the UE may have some problem because during the OFF period, the UE may not be able to detect the CRS which may impact accuracy of the measurement and cause detection errors.

In the legacy LTE system, measurement gaps are configured to let UE to do measurement for other (inter-frequency) neighbor cells or other RATs. Once configured, the measurement gap happens periodically and the UE can do measurements of the neighbor cells it selects using the same gap pattern. In other words, during the measurement gaps, the UE performs its inter-frequency and inter-RAT measurements and it depends on the UE implementation which measurement object is measured at which particular measurement gap. Thus, it is difficult for the network to control the measurements for the unlicensed band using the conventional measurement gaps to ensure that the measurements would only happen during the LTE ON period. A more flexible solution is needed.

In the current LTE systems, there are two types of measurements: one type requires the measurement gaps and the other type doesn't require these gaps. The UE reports the gap requirement to the eNB with UE capability signaling and it is up to the eNB to configure the gaps if the corresponding measurement is needed. In the Stage 2 specifications 3GPP TS 36.300 V10.4.0 (2011-06), there are example schematics illustrating some scenarios on whether the measurement gap is needed as shown in FIG. 1 (where the current and target cells operating at the same carrier frequency) or the measurement gap is not needed as shown in FIG. 2 (where the current and target cells operating at different carrier frequencies). These A measurement gap could be configured to trigger the UE to do inter-frequency and inter-RAT measurement. The UE behavior is described in RRC specifications 3GPP TS 36.331 V10.2.0 (2011-06) as follows:

---

The UE shall:
  1> if measGapConfig is set to setup:
    2> if a measurement gap configuration is already setup, release
      the measurement gap configuration;
    2> setup the measurement gap configuration indicated by the
      measGapConfig in accordance with the received gapOffset,
      i.e., each gap starts at an SFN and subframe meeting the
      following condition:
        SFN mod T = FLOOR(gapOffset/10);
        subframe = gapOffset mod 10;
        with T = MGRP/10 as defined in TS 36.133 [16];
  1> else:
    2> release the measurement gap configuration;

---

Furthermore, the measurement gap can have two possible periodicity configurations, as described in RRM requirements specification 3GPP TS 36.133 V10.3.0 (2011-06), as shown in Table 1 below.

TABLE 1

Measurement gap patterns specified in 36.133

| Gap Pattern Id | MeasurementGap Length (MGL, ms) | Measurement Gap Repetition Period (MGRP, ms) | Minimum available time for inter-frequency and inter-RAT measurements during 480 ms period (Tinter1, ms) | Measurement Purpose |
|---|---|---|---|---|
| 0 | 6 | 40 | 60 | Inter-Frequency E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |

The measurement gaps happen periodically once configured, and the eNB cannot control which measurement object is measured during each gap.

Additionally, a method called enhanced inter-cell interference coordination (eICIC) has been defined in Release 10 of 3GPP. In this method, the eNB is able to affect slightly more specifically the measurement instants when the UE does intra-frequency measurements. However, this mechanism so far (up to Release 10 of 3GPP) is only possible for the intra-frequency measurements (which never require measurement gaps), so is not directly applicable to the measurements requiring measurement gaps. Moreover, the eICIC does not provide a certainty of when the UE does the measurements, and the 40 ms periodicity that the eICIC patterns have may limit its usefulness to the unlicensed band usage.

The Release 8 of 3GGP for the LTE includes a measurement mechanism called Automatic Neighbor Relation (ANR), see 3GPP TS 36.300 V10.4.0 (2011-06) and 3GPP TS 36.331 V10.2.0 (2011-06) for description of the procedure, wherein the eNB instructs the UE to do measurements in a "best effort" basis for a specific measurement purpose, i.e., acquiring the SI from a neighbor cell, a procedure which is normally not supported during active transmission. The measurement is given with a timer attached to control how long the UE does the measurement. The idea is that the UE is expected (to the best of its ability) to use idle periods in transmission (e.g., DRX, unused measurement gaps) for this specific measurement purpose, with the limitation that the measurement should not cause degradation to the normal UE operation. Once the UE has either completed the specific measurement purpose (i.e., has acquired the required SI information from the specified neighbor cell) or the timer attached to the specific measurement purpose expires, the UE automatically reports the results of this procedure to the eNB, i.e., letting the eNB know whether the measurement was successful and if it was, what the results were. After this, the specific measurement purpose is removed until the eNB chooses to re-configure it. However, it should be noted that the ANR procedure places no restrictions as to when the UE does the measurement.

SUMMARY

According to a first aspect of the invention, a method comprises: receiving by a user equipment from a wireless network an aperiodic measurement request to measure a special measurement object specified in the aperiodic measurement request; and measuring the special management object in response to the aperiodic measurement request until a further instruction from the wireless network or for a determined period of time.

According to a second aspect of the invention, an apparatus comprises: at least one processor and a memory storing a set of computer instructions, in which the processor and the memory storing the computer instructions are configured to cause the apparatus to: receive from a wireless network an aperiodic measurement request to measure a special measurement object specified in the aperiodic measurement request; and measure the special management object in response to the aperiodic measurement request until a further instruction from the wireless network or for a determined period of time.

According to a third aspect of the invention, a computer readable memory encoded with a computer program comprising computer readable instructions recorded thereon for execution a method comprising: receiving by a user equipment from a wireless network an aperiodic measurement request to measure a special measurement object specified in the aperiodic measurement request; and measuring the special management object in response to the aperiodic measurement request until a further instruction from the wireless network or for a determined period of time.

According to a fourth aspect of the invention, a method comprises: determining, in a wireless network, parameters for an aperiodic measurement request to measure a special measurement object by a user equipment, the parameters include the special measurement object; and sending the aperiodic measurement request comprising the parameters to the user equipment for measuring the special management object.

According to a fifth aspect of the invention, an apparatus comprises: at least one processor and a memory storing a set of computer instructions, in which the processor and the memory storing the computer instructions are configured to cause the apparatus to: determine parameters for an aperiodic measurement request to measure a special measurement object by a user equipment, the parameters include the special measurement object; and send the aperiodic measurement request comprising the parameters to the user equipment for measuring the special management object.

According to a sixth aspect of the invention, a computer readable memory encoded with a computer program comprising computer readable instructions recorded thereon for execution a method comprising: determining, in a wireless network, parameters for an aperiodic measurement request to measure a special measurement object by a user equipment, the parameters include the special measurement object; and sending the aperiodic measurement request comprising the parameters to the user equipment for measuring the special management object.

BRIEF DESCRIPTION OF THE DRAWINGS

For a better understanding of the nature and objects of the present invention, reference is made to the following detailed description taken in conjunction with the following drawings, in which.

DETAILED DESCRIPTION

Figure 1:
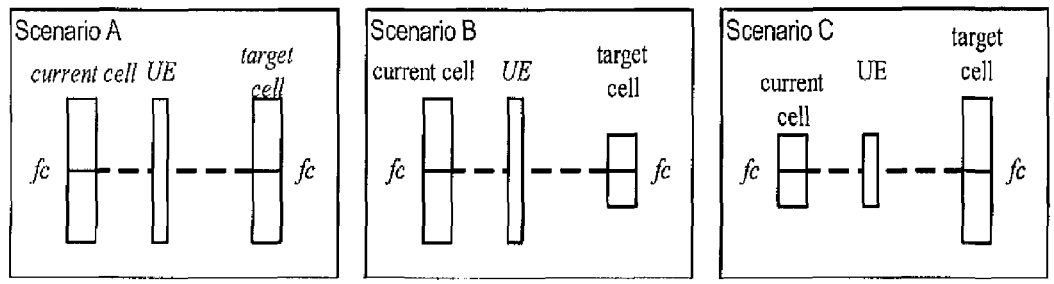
FIG. 1 is a schematic diagram of measurement conditions (A, B and C scenarios) which don't need measurement gap.
Figure 2:
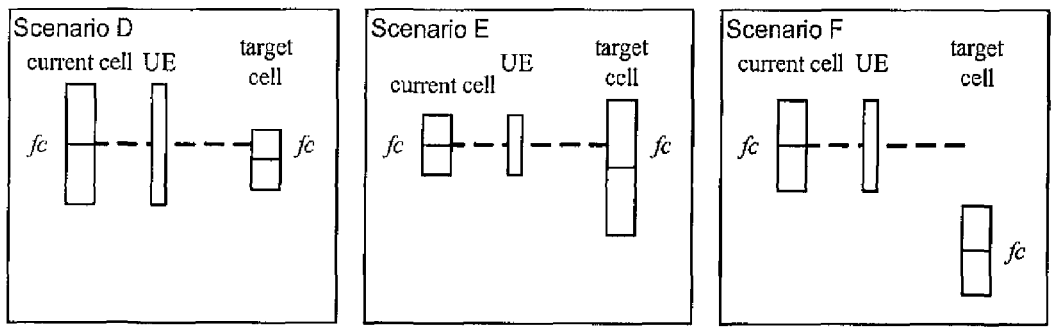
FIG. 2 is a schematic diagram of measurement conditions (D, E and F scenarios) which need measurement gap.

A new method, apparatus, and software related product (e.g., a computer readable memory) are presented for implementing enhanced and flexible radio measurements on an unlicensed band, e.g., in LTE wireless systems and providing effective and timely reporting.

Because of irregular ON/OFF pattern in the LTE systems (in which a UE's OFF period is when it may measure neighbour cells and its ON period is when it must listen to its serving cell), a more flexible and controllable RRM measurement mechanism should be used. There may be also some differences for the two different types of measurements, i.e., those measurement requiring gaps (e.g., for inter-frequency measurements) and those that do not need gaps (e.g., for intra-frequency measurements). Below, a few examples of embodiments for enabling a flexible measurement on the unlicensed band and subsequent reporting in the LTE system are presented.

EXAMPLE 1

According to this embodiment, a new aperiodic measurement process in the unlicensed band may be triggered by the eNB to provide a measurement that is strictly controlled to certain time instants and tied to a special (possibly pre-defined) measurement object.

First, the eNB may configure a special measurement object (and related configuration) to a UE. Then, RRC, MAC and/or PHY layer signalling is sent to the UE to trigger the measurement usage. The following may apply for this procedure.

The UE is signalled a basic gap pattern that may be dynamically altered via other means (e.g., events, further signalling), so that the UE may not make measurements linked to the special measurement object in the same way as the normal measurements, i.e., not using the periodical measurement gap or other normal measurement procedures (e.g., S-measure mechanism defining when the UE is required to perform measurements, see 3GPP TS 36.331 V10.2.0 (2011-06) Section 5.5.3.1, should not be applied for measurements linked to the special measurement object). Moreover, the UE may not be allowed to perform measurements outside the specified measurement gap pattern, regardless of its capabilities. In other words, the measurements are restricted to only the signalled measurement pattern.

According to this embodiment, the eNB may send a trigger signal (e.g., an aperiodic trigger measurement request) which can be, e.g., MAC CE or PHY control channel signalling, either via broadcast message or via dedicated signalling to the UE. Upon receiving the trigger signal the UE may start doing measurements on the configured special measurement object according to following rules: if the measurement gap is needed (e.g., for inter-frequency measurements) similarly as with normal gap configuration, the eNB should also indicate (e.g., in the aperiodic trigger measurement request) the starting point, duration and repetition of the measurement gap so the UE knows how many measurements it is expected to perform (e.g., to make measurements for a specified period of time). The same gap duration as with legacy gap procedure may be used here to ensure the UE can find the target carrier signal. If, however, no measurement gap is needed, the eNB may just signal (via broadcast or dedicated signalling) whether the measurement is prohibited or not and leave implementation details to the UE.

The special measurement object may be a carrier frequency, a set of carrier frequencies, or in general, a legacy measurement object, e.g., various measurement IE can be found in 3GPP TS 36.331 V10.2.0 (2011-06) Section 6.3.5.

Figure 3:
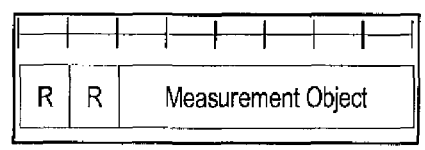
FIG. 3 is a diagram of a possible MAC CE to trigger an aperiodic measurement according to an exemplary embodiment of the invention.

The eNB should configure the measurement object and corresponding measurement parameters beforehand. To quickly and flexibly trigger the measurement, the eNB may use MAC CE or PHY control channel; it could just include the information that it is a measurement trigger and which measurement object is triggered. FIG. 3 shows an exemplary MAC CE for such signaling, i.e., to trigger aperiodic measurement (R stands for "reserved").

Another way may be to use the event configuration, i.e., have the events themselves describe whether the measurement object they are linked to should have special handling (this would also enable the linking of these special measurement events to "normal" measurement objects, if so desired). An example is shown below:

```
ReportConfigEUTRA ::=            SEQUENCE {
  triggerType                      CHOICE {
    event                            SEQUENCE {
      eventId                          CHOICE {
        eventA1                          SEQUENCE {
          a1-Threshold                     ThresholdEUTRA
        },
        eventA2                          SEQUENCE {
          a2-Threshold                     ThresholdEUTRA
        },
        eventA3                          SEQUENCE {
          a3-Offset                        INTEGER (-30..30),
          reportOnLeave                    BOOLEAN
        },
        eventA4                          SEQUENCE {
          a4-Threshold                     ThresholdEUTRA
        },
        eventA5                          SEQUENCE {
          a5-Threshold1                    ThresholdEUTRA,
          a5-Threshold2                    ThresholdEUTRA
        },
        ...,
        eventA6                          SEQUENCE {
          a6-Offset                        INTEGER (-30..30),
          a6-ReportOnLeave                 BOOLEAN
        }
      },
      hysteresis                       Hysteresis,
      timeToTrigger                    TimeToTrigger
    },
    periodical                       SEQUENCE {
      purpose                          ENUMERATED {
                                         reportStrongestCells, reportCGI}
    }
  },
  triggerQuantity                  ENUMERATED {rsrp, rsrq},
  reportQuantity                   ENUMERATED {sameAsTriggerQuantity, both},
  maxReportCells                   INTEGER (1..maxCellReport),
  reportInterval                   ReportInterval,
  reportAmount                     ENUMERATED {r1, r2, r4, r8, r16, r32, r64, infinity},
  ...,
  [[ si-RequestForHO-r9              ENUMERATED {setup}    OPTIONAL, --
Cond reportCGI
     ue-RxTxTimeDiffPeriodical-r9   ENUMERATED {setup}    OPTIONAL -- Need
OR
  ]],
  [[ includeLocationInfo-r10         ENUMERATED {true}                 OPTIONAL, --
Cond reportMDT
     reportAddNeighMeas-r10         ENUMERATED {setup}    OPTIONAL -- Need
OR
  ]]
  specialPurpose                   BOOLEAN        OPTIONAL   -- Need
UnlicensedBand
}
ThresholdEUTRA ::=               CHOICE{
  threshold-RSRP                   RSRP-Range,
  threshold-RSRQ                   RSRQ-Range
}
-- ASN1STOP
```

This would enable all the same events to be used as for legacy measurements, just with the distinction that the measurements are actually done differently.

After the measurement is done at the UE side, it is quite important to report the results to the eNB. The UE may reports the measurement results according to usual measurement configuration rules. The configuration of the actual measurement event may be as per legacy procedures, or follow special rules as described below (e.g., see Example 2). Normal event-triggered or event-triggered periodical measurement event configuration may be used for triggering a report, but there could also be modified configurations to avoid problems due to the more restricted measurement protocol. For example, the parameter time to trigger (TTT) may be longer than the ON period of the LTE system or there might be an overlap of the OFF LTE period and the TTT. These situations are further discussed in Example 2 below.

EXAMPLE 2

According to this embodiment, the UE may be configured e.g., using a legacy measurement event with event triggered measurement reporting scheme but with modified treatment as to when the measurement report is triggered in relation to ON/OFF periods of the LTE cell (e.g., a current cell of the UE).

With a normal TTT operation, once TTT is started, it will continue regardless of the measurement state. For example, when an OFF-period starts, since the UE would not do any new measurements, a running TTT could expire also during the OFF period. Additionally, if the TTT still runs when the next ON-period starts, mixing the measurement result from the new ON-period with the results from previous ON-period (e.g., in a L3 filter) may also cause some inaccuracy because UE radio conditions might have been altered if the OFF-period was long enough. Hence, according to this embodiment, the TTT may be modified as follows.

In one embodiment, the TTT may be determined as a multiple of the measurement gap occasions, i.e. 0 . . . N measurements during the gaps (in other words, the TTT is expired after a predefined number of measurement gaps), irrespective of the ON/OFF cycles of the cell (i.e., the TTT is paused when the OFF duration begins).

In another embodiment, the TTT may be truncated so that if the TTT is running when the OFF period begins, a measurement report is always triggered, i.e., the report of the event is sent along with the value of the TTT timer when the OFF period began. (i.e., the OFF period always triggers the report). This provides more information to the eNB about the UE measurement status when the OFF period starts. In other words, if a TTT period is interrupted by an OFF period of the current serving cell of the UE, the measurement report is automatically triggered and sent with an indication of the value of the time to trigger period when the OFF period of the cell started.

In a further embodiment a validity timer, e.g., called as "MeasurementValidTimer" may be configured to ensure the measurement result is valid as follows: once the LTE system enters the OFF period, the UE would start the MeasurementValidTimer (and stop measuring), and if the LTE system enters the ON period before the MeasurementValidTimer expires, the UE would stop the timer and continue forwarding the new measurement results normally, e.g., for L3 filtering. However, if the MeasurementValidTimer expires before the LTE system enters the ON period, the UE flushes the previous L3-filtered measurement results and restarts the L3 filtering from the first valid measurement result. The expiration time of the MeasurementValidTimer may be a predefined value configured by the eNB and signalled to the UE, e.g., in the aperiodic measurement request. In other words, when the TTT period is interrupted by the OFF period of the current serving cell of the UE, if the duration of the OFF period is smaller than a predefined value, the measurement report includes measuring results collected before starting the OFF period, and if the duration of the OFF period is larger than a predefined value, the measurement report excludes measuring results collected before starting the OFF period.

One possible RRC IE to configure the special measurement object with the measurementValidTimer may be as follows:

```
MeasObjectEUTRAonUnlicensedBand ::=  SEQUENCE {
    carrierFreq              ARFCN-ValueEUTRA,
    allowedMeasBandwidth     AllowedMeasBandwidth,
    presenceAntennaPort1     PresenceAntennaPort1,
    offsetFreq               Q-OffsetRange    DEFAULT dB0,
    measurementValidTimer       ENUMERATED {t1, t2, t3, ...}
}
```

EXAMPLE 3

According to this embodiment, in order to get a more flexible/fast measurement and reporting, the eNB may also use the PHY control channel to send the measurement request (e.g., aperiodic measurement request) and let the UE do consecutive measurement for x subframes. The UE reports the measurement result as soon as possible after the measurement is finished. The eNB may send the measurement request to the UE which includes a pattern during which the measurements are done and a number of subframes on which the UE should consecutively do one corresponding measurement. The UE reports the measurement results after the measurement is finished.

Moreover, the measurement request (e.g., aperiodic measurement request) may contain a UL grant that has a different timing compared to the legacy LTE system (e.g., the timing for the TTI may be longer than the legacy maximum (i.e., 4 subframes for FDD and 7 subframes for TDD). Then, the UE reports the measurement result using the resources given by the UL grant.

Furthermore, the measurement report may be sent after a fixed duration, but the measurements (and the gap pattern) may also continue until further notice from the eNB or for a fixed number of measurement cycles. The UE could continue measuring, and a new report could be generated and sent after ending each fixed cycle. For example, if there is a cycle of X ms, the UE does measurements for the duration of the cycle, reports the results and continues with a new cycle of the same length. Alternatively, the eNB may send specific UL grant to the UE to request the measurement results, which would trigger the UE to send the results with the UL transmission keyed to the UL grant.

The eNB may send on PDCCH a measurement request containing UL grant. It could have a new DCI format or addressed to a new RNTI. The measurement request may include at least the following information:
  1. The subframe n+x when the UL transmission should happen, where n is the subframe when the UL grant is transmitted;
  2. The measurement object index;
  3. The time-frequency resource for the UL transmission.

It is further noted that according to a further embodiment, the methodologies described in Examples 1-3 above demonstrating aperiodic measurements and reporting for a special measurement object may be applied not only to unlicensed bands.

Figure 4:
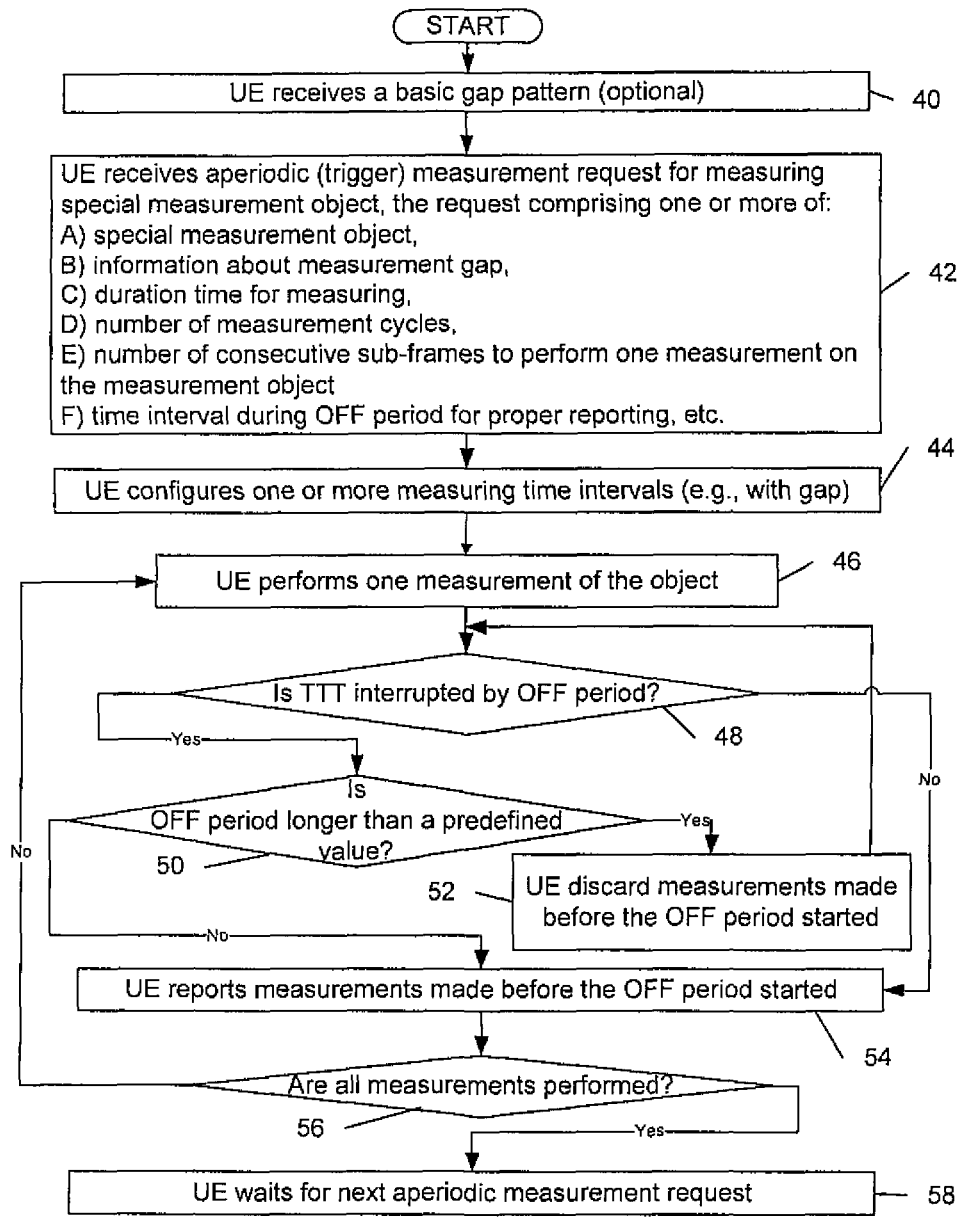
FIG. 4 is a flow chart demonstrating implementation of exemplary embodiments of the invention performed by a user equipment.

FIG. 4 shows an exemplary flow chart demonstrating implementation of embodiments of the invention performed by the user equipment. It is noted that the order of steps shown in FIG. 4 is not absolutely required, so in principle, the various steps may be performed out of the illustrated order. Also certain steps may be skipped, different steps may be added or substituted, or selected steps or groups of steps may be performed in a separate application.

In a method according to this exemplary embodiment, as shown in FIG. 4, in a first step 40 a UE receives from a wireless network (e.g., from the eNB of the current cell) a basic gap pattern (this step may be optional). In a next step 42, the UE receives aperiodic (trigger) measurement request for measuring special measurement object (e.g., in the unlicensed band) as described herein using different embodiments of the invention. The request may comprise (but is not limited to) one or more of: A) a special measurement object, B) information about measurement gap (e.g., whether the measurement gap is needed, a starting point of the measurement gap, a duration of the measurement gap, and/or a repetition rate of the measurement gap, etc.); C) a duration time for measuring, D) a number of measurement cycles, E) a number of consecutive sub-frames to perform one measurement on the measurement object, and/or F) a time interval during the OFF period for a proper reporting, etc.

In a next step 44, the UE configures one or more measuring time intervals, e.g. based on information including the aperiodic measurement request. In a next step 46, the UE performs one (e.g., first) measurement of the specified measurement object. In a next step 48 is it determined whether the TTT (time to trigger) period is interrupted by the OFF period of the current serving cell. If that is not the case, the process goes to step 54. However, if it is determined that the TTT period is interrupted by the OFF period of the current cell, it is further determined in a next step 50 whether the OFF period is longer than a predefined value (using, e.g., "MeasurementValid-Timer" as disclosed herein in Example 2). If that is the case, in step 52, the UE discards measurements made before the OFF period started. However, if it is determined that the OFF period is not longer than a predefined value, then in step 54 the UE reports of measurements made before the OFF period started.

In a next step 56, it is determined whether all measurements are performed (in response to the aperiodic measurement request). If that is the case, then in a next step 58 the UE waits for a next aperiodic measurement request from the wireless network (eNB). However, if it is determined that not all measurements are performed, the process goes back to step 46 and next measurement of the specific measurement object is performed by the UE.

Figure 5:
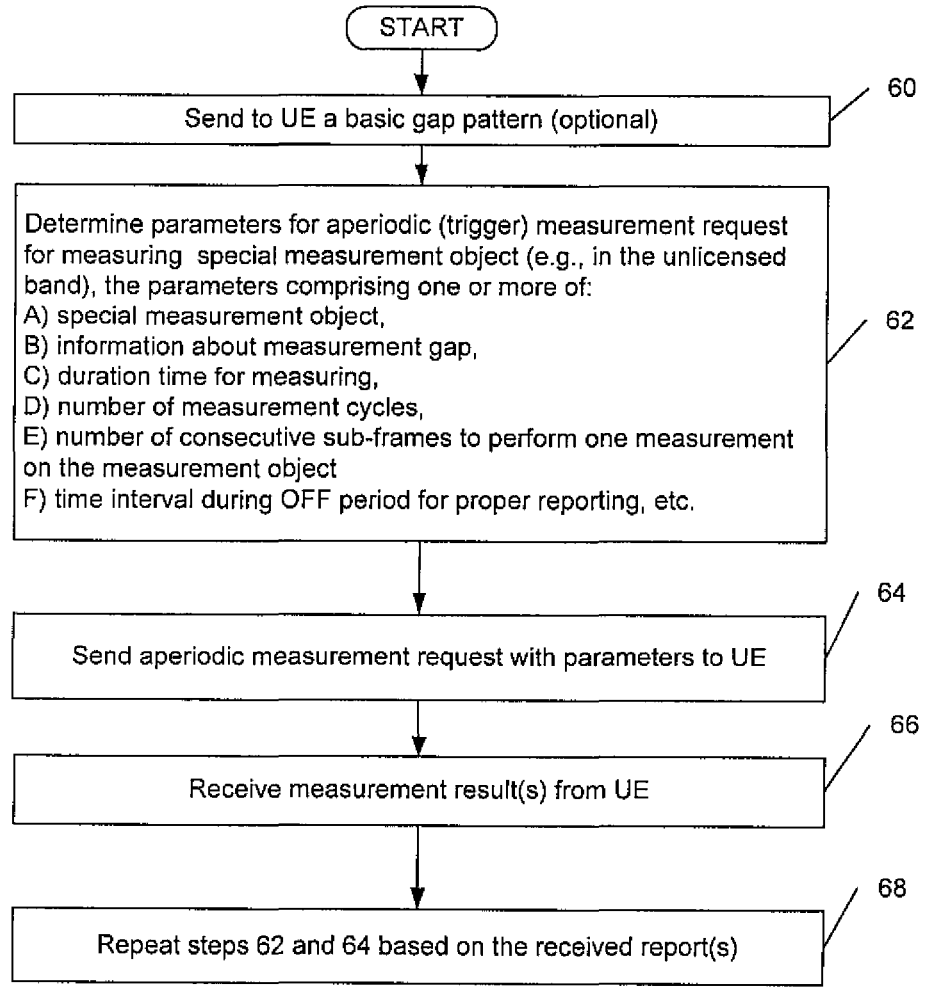
FIG. 5 is a flow chart demonstrating implementation of exemplary embodiments of the invention performed by a network element (e.g., eNB)
Figure 6:
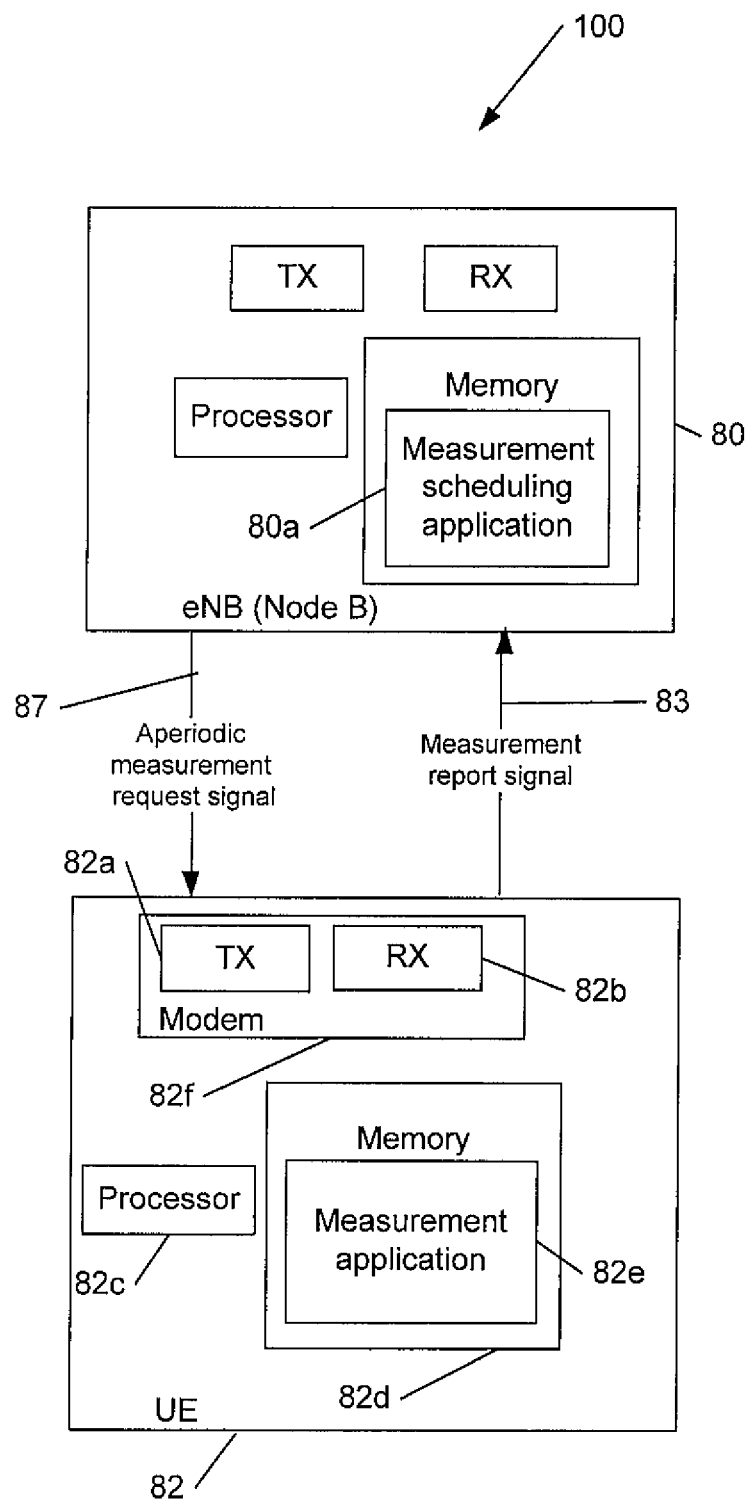
FIG. 6 is a block diagram of wireless devices for practicing exemplary embodiments of the invention.

FIG. 5 shows an exemplary flow chart demonstrating implementation of embodiments of the invention performed by a network element (e.g., the eNB shown on FIG. 6). It is noted that the order of steps shown in FIG. 6 is not absolutely required, so in principle, the various steps may be performed out of the illustrated order. Also certain steps may be skipped, different steps may be added or substituted, or selected steps or groups of steps may be performed in a separate application.

In a method according to this exemplary embodiment, as shown in FIG. 5, in a first step 60 a network element (e.g., eNB) sends to the UE a basic gap pattern (this step may be optional). In a next step 62, the network element determines parameters of an aperiodic (trigger) measurement request for measuring special measurement object (e.g., in the unlicensed band), as described herein using different embodiments of the invention. The parameters may comprise (but is not limited to) one or more of A) a special measurement object, B) information about measurement gap (e.g., whether the measurement gap is needed, a starting point of the measurement gap, a duration of the measurement gap, and/or a repetition rate of the measurement gap, etc.); C) a duration time for measuring, D) a number of measurement cycles, E) a number of consecutive sub-frames to perform one measurement on the measurement object, and/or F) a time interval during OFF period for a proper reporting, etc. In a next step 64, the network element (eNB) sends aperiodic (trigger) measurement request with the determined/selected parameter(s) in step 62, which at least include the special measurement object, to the UE. In a next step 66, the network element receives report(s) of measurement result(s) from the UE, so that in a next step 68, the network element repeats steps 62 and 64 based on the received report(s).

FIG. 6 shows an example of a block diagram demonstrating LTE devices including eNB 80 and UE 82 comprised in a cellular network 100, according to an embodiment of the invention. FIG. 6 is a simplified block diagram of various electronic devices and apparatus that are suitable for use in practicing the exemplary embodiments of this invention, e.g., in reference to FIGS. 4 and 5, and a specific manner in which components of an electronic device are configured to cause that electronic device to operate. The UE 82 may be implemented as a mobile phone, a wireless communication device, a camera phone, a portable wireless device and the like.

The UE 82 may comprise, e.g., at least one transmitter 82a at least one receiver 82b, at least one processor 82c at least one memory 82d and a measurement application module 82e. The transmitter 82a and the receiver 82b and corresponding antennas (not shown in FIG. 6) may be configured to provide wireless communications with eNB 80 (e.g., using the licensed band) and perform measurement of the special measurement object(s) (e.g., using the unlicensed band) respectively, according to the embodiment of the invention. The transmitter 82a and the receiver 82b may be generally means for transmitting/receiving and may be implemented as a transceiver, or a structural equivalence (equivalent structure) thereof.

Furthermore, the UE 82 may further comprise communicating means such as a modem 82f, e.g., built on an RF front end chip of the UE 82, which also carries the TX 82a and RX 82b for bidirectional wireless communications via data/control wireless links 87 and 83 (e.g. on the licensed band), for sending/receiving signals (e.g., the aperiodic measurement request signal, the measurement report signal) for communicating with the eNB 80.

Various embodiments of the at least one memory 82d (e.g., computer readable memory) may include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the processor 82c include but are not limited to general purpose computers, special purpose computers, microprocessors, digital signal processors (DSPs) and multi-core processors.

The measurement application module 82e may facilitate performing measurements of the special measurement object(s) and reporting the results according to embodiments of the invention, as described herein and illustrated, e.g., in FIG. 4 (steps 40-58). The module 82e may be implemented as an application computer program stored in the memory 82d, but in general it may be implemented as a software, a firmware and/or a hardware module or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor.

Furthermore, the module 82e may be implemented as a separate block or may be combined with any other module/block of the UE 82 or it may be split into several blocks according to their functionality. Moreover, it is noted that all or selected modules of the UE 82 may be implemented using an integrated circuit (e.g., using an application specific integrated circuit, ASIC).

The eNB 80 may have similar components as the UE 82, as shown in FIG. 6, so that the above discussion about components of the UE 82 is fully applied to the components of the eNB 80. The measurement scheduling module 80a in the eNB 80 may facilitate providing the aperiodic measurements request with corresponding parameters for performing measurements of the special measurement object and analyzing the results of measurements for providing further instructions according to embodiments of the invention, as described herein and illustrated, e.g., in FIG. 5 (steps 60-68). The module 80a may be implemented as a software, a firmware and/or a hardware module or a combination thereof. In particular, in the case of software or firmware, one embodiment may be implemented using software related product such as a computer readable memory (e.g., non-transitory computer readable memory), a computer readable medium or a computer readable storage structure comprising computer readable instructions (e.g., program instructions) using a computer program code (i.e., the software or firmware) thereon to be executed by a processor.

Furthermore, the module 80a may be implemented as a separate block or may be combined with any other module/block of the eNB 80 or it may be split into several blocks according to their functionality. Moreover, it is noted that all or selected modules of the device 80 may be implemented using an integrated circuit (e.g., using an application specific integrated circuit, ASIC).

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

What is claimed is:

1. A method comprising:
    receiving, by a user equipment, from a wireless network an aperiodic measurement request to measure a special measurement object in an unlicensed band specified in the aperiodic measurement request;
    measuring the special measurement object in response to the aperiodic measurement request for a determined period of time; and
    configuring one or more measuring time intervals for the user equipment during respective one or more measurement gaps for inter-frequency measurements based on the aperiodic measurement request, the one or more measuring time intervals defining the determined period of time,
    the method further comprising configuring the user equipment to perform measurements of measurement objects different than the special measurement object in measurement gaps for inter-frequency measurements, and configuring the user equipment to measure the special measurement object in the one or more time intervals specified in the aperiodic measurement request, without the user equipment measuring the special measurement object outside of the one or more time intervals.

2. The method of claim 1, wherein the aperiodic measurement request comprises information about a measurement gap which includes one or more of:
    whether the measurement gap is needed,
    a starting point of the measurement gap,
    a duration of the measurement gap, and
    a repetition rate of the measurement gap.

3. The method of claim 1, wherein the aperiodic measurement request comprises a number of consecutive sub-frames to perform the measuring.

4. The method of claim 1, wherein the aperiodic measurement request is an aperiodic trigger measurement request so that the measuring starts immediately after receiving the aperiodic trigger measurement request.

5. The method of claim 1, wherein the aperiodic measurement request comprises a number of measurement cycles which determines the determined period of time.

6. The method of claim 1, wherein the aperiodic measurement request comprises an uplink grant for sending a measurement report.

7. The method of claim 1, wherein the special measurement object comprises one or more neighboring cells.

8. The method of claim 1, wherein a time to trigger a measurement report is counted by a number of the measurement gaps.

9. The method of claim 1, wherein a time to trigger period is interrupted by an OFF period of a current serving cell of the user equipment, and a measurement report is automatically triggered and sent with an indication of a value of the time to trigger period when the OFF period of the cell started.

10. The method of claim 1, wherein a time to trigger period is interrupted by an OFF period of a current serving cell of the user equipment,
    where, if a duration of the OFF period is smaller than a predefined value, a measurement report includes measuring results collected before starting the OFF period, and
    if a duration of the OFF period is larger than a predefined value, the measurement report excludes measuring results collected before starting the OFF period.

11. An apparatus comprising:
    circuitry configured to:
    receive from a wireless network an aperiodic measurement request to measure a special measurement object in an unlicensed band_specified in the aperiodic measurement request;
    measure the special measurement object in response to the aperiodic measurement request for a determined period of time;
    configure one or more measuring time intervals for the user equipment during respective one or more measurement gaps for inter-frequency measurements based on the aperiodic measurement request, the one or more measuring time intervals defining the determined period of time; and
    configure the user equipment to perform measurements of measurement objects different than the special measurement object in measurement gaps for inter-frequency measurements, and configure the user equipment to measure the special measurement object in the one or more time intervals specified in the aperiodic measurement request, without the user equipment measuring the special measurement object outside of the one or more time intervals.

12. The apparatus of claim 11, wherein the aperiodic measurement request comprises information about a measurement gap which includes one or more of:
    whether the measurement gap is needed,
    a starting point of the measurement gap,
    a duration of the measurement gap, and
    a repetition rate of the measurement gap.

13. The apparatus of claim 11, wherein the aperiodic measurement request comprises a number of consecutive sub-frames to perform the measuring.

14. The apparatus of claim 11, wherein the aperiodic measurement request is an aperiodic trigger measurement request so that the measuring starts immediately after receiving the aperiodic trigger measurement request.

15. The apparatus of claim 11, wherein the aperiodic measurement request comprises a number of measurement cycles which determines the determined period of time.

16. A non-transitory computer readable memory encoded with a computer program comprising computer readable instructions recorded thereon for executing a method comprising:
- receiving, by a user equipment, from a wireless network an aperiodic measurement request to measure a special measurement object in an unlicensed band specified in the aperiodic measurement request;
- measuring the special measurement object in response to the aperiodic measurement request for a determined period of time; and
- configuring one or more measuring time intervals for the user equipment during respective one or more measurement gaps for inter-frequency measurements based on the aperiodic measurement request, the one or more measuring time intervals defining the determined period of time,
- the method further comprising configuring the user equipment to perform measurements of measurement objects different than the special measurement object in measurement gaps for inter-frequency measurements, and configuring the user equipment to measure the special measurement object in the one or more time intervals specified in the aperiodic measurement request, without the user equipment measuring the special measurement object outside of the one or more time intervals.

* * * * *